United States Patent
Scherer et al.

(10) Patent No.: US 12,025,165 B2
(45) Date of Patent: Jul. 2, 2024

(54) FASTENING DEVICE FOR FASTENING TO A PLATE-LIKE ELEMENT

(71) Applicant: ILLINOIS TOOL WORKS INC., Glenview, IL (US)

(72) Inventors: Christian Scherer, Rothenburg (DE); Matthias Wolf, Rodgau (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 396 days.

(21) Appl. No.: 17/422,284

(22) PCT Filed: Jan. 8, 2020

(86) PCT No.: PCT/US2020/012680
§ 371 (c)(1),
(2) Date: Jul. 12, 2021

(87) PCT Pub. No.: WO2020/150052
PCT Pub. Date: Jul. 23, 2020

(65) Prior Publication Data
US 2022/0120307 A1    Apr. 21, 2022

(30) Foreign Application Priority Data
Jan. 15, 2019  (DE) .................... 10 2019 100 946.4

(51) Int. Cl.
*F16B 21/08*    (2006.01)
*F16B 5/06*    (2006.01)
*F16B 11/00*    (2006.01)

(52) U.S. Cl.
CPC .......... *F16B 21/086* (2013.01); *F16B 5/0642* (2013.01); *F16B 11/006* (2013.01)

(58) Field of Classification Search
CPC ........ F16B 21/06; F16B 21/08; F16B 21/086; F16B 5/06; F16B 5/0607; F16B 5/0642; F16B 5/065; B60R 13/0206
See application file for complete search history.

(56) References Cited

U.S. PATENT DOCUMENTS 4,334,632 A * 6/1982 Watanabe .............. B62D 25/24
                                                    220/DIG. 19
5,342,139 A * 8/1994 Hoffman ................. F16B 5/065
                                                    267/64.23
(Continued)

FOREIGN PATENT DOCUMENTS

CN        1142019 A      2/1997
CN        105102830 A    11/2015
(Continued)

OTHER PUBLICATIONS

PCT, International Search Report and Written Opinion, International Application No. PCT/US2020/012680; dated Apr. 14, 2020, 10 pages.

*Primary Examiner* — Jonathan P Masinick
(74) *Attorney, Agent, or Firm* — THOMPSON HINE LLP

(57) ABSTRACT

A fastening device (100), for fastening to a plate-like element, has a head (110) and a foot (120). The foot (120) has: a core (121) extending from the head (110) along an axis of rotation; and at least one group of blades (122) which are elastic at least in regions and extend outwards from the core (121). Each of the blades (122) has an oblique shoulder (123) or a shoulder with a finely stepped gradation, formed on the outer edge of the corresponding blade (122), said outer edge being arranged towards the head (110). The oblique shoulder (123) or the individual steps of the gradation of the shoulder is inclined with a slope with respect to a plane which has the axis of rotation of the core as a perpendicular. The shoulders (123) of the blades are (Continued)

arranged at different heights from one another along the axis of rotation.

15 Claims, 7 Drawing Sheets

(56) References Cited

U.S. PATENT DOCUMENTS

| | | | |
|---|---|---|---|
| 5,454,479 A | 10/1995 | Kraus | |
| 5,658,110 A | 8/1997 | Kraus | |
| D638,103 S * | 5/2011 | Roll | F16L 55/1141 D23/260 |
| 7,967,539 B2 * | 6/2011 | Huet | F16B 21/086 411/509 |
| 8,162,166 B2 * | 4/2012 | Nakazato | B62D 25/24 220/359.4 |
| 8,381,943 B2 * | 2/2013 | Leverger | B62D 25/24 220/359.4 |
| 8,393,058 B2 * | 3/2013 | Okada | B60R 13/0206 24/297 |
| 9,309,972 B2 * | 4/2016 | Sato | F16J 13/14 |
| 9,714,055 B2 * | 7/2017 | Shimada | B62D 25/24 |
| 9,850,927 B2 * | 12/2017 | Bradley | F16B 19/1081 |
| 9,963,087 B2 * | 5/2018 | Leverger | F16B 13/045 |
| 10,640,996 B2 * | 5/2020 | Hartman | E04G 21/32 |
| 11,255,362 B2 * | 2/2022 | VanHuis | B62D 25/24 |
| 2007/0108216 A1 * | 5/2007 | Kurth | B60R 13/0206 220/789 |
| 2007/0241256 A1 | 10/2007 | Stigler | |
| 2009/0022567 A1 | 1/2009 | Huet | |
| 2009/0265900 A1 | 10/2009 | Okada et al. | |
| 2020/0408236 A1 * | 12/2020 | Sánchez Burger | F16B 19/1081 |

FOREIGN PATENT DOCUMENTS

| | | |
|---|---|---|
| DE | 202004007055 U1 | 7/2004 |
| EP | 1688658 A1 | 8/2006 |
| EP | 2980422 A1 | 2/2016 |
| FR | 2944569 A1 | 10/2010 |
| FR | 3016937 A1 | 7/2015 |
| WO | WO 2007099393 | 9/2007 |
| WO | WO 2016069125 A1 | 5/2016 |

* cited by examiner

FASTENING DEVICE FOR FASTENING TO A PLATE-LIKE ELEMENT

TECHNICAL FIELD

The invention relates to a fastening device for fastening same or elements to a preferably at least substantially plate-like element, in particular to a body panel of a vehicle. The invention furthermore relates to a method for producing such a fastening device.

BACKGROUND

Fastening devices of the above-mentioned type are already known in the prior art, wherein said fastening devices conventionally have a head and a foot region. The foot region is pressed through a bore in the plate-like element and serves to hold the fastening device in the plate-like element.

Foot regions of this type conventionally have a core from which a plurality of identically designed elastic blades extend outwards. When the fastening device is inserted into the plate-like element, the blades can be deformed elastically in the direction of the core such that they permit a holding force or engagement of the foot in the bore.

However, the fastening devices known in the prior art have disadvantages to the effect that they require high installation forces, cannot be satisfactorily used in the case of plate-like elements having different thicknesses or thickness tolerances and use complicated, insufficiently perfected production methods.

SUMMARY

The invention is therefore based on the object of specifying a fastening device for fastening to a plate-like element, said fastening device eliminating the abovementioned problems and disadvantages of the prior art. In particular, it is an object of the present invention to specify a fastening device which requires only low installation forces and can be used in the case of plate-like elements having different thicknesses. Furthermore, it is an object of the present invention to specify a method for producing a fastening device, which permits simple production of the fastening device.

The solution according to the invention consists in designing a fastening device for fastening to a plate-like element, wherein the fastening device has a head and a foot, wherein the foot has the following: a core which extends from the head along an axis of rotation; and at least one group of blades which are elastic at least in regions and extend outwards from the core, wherein each of the blades has an oblique shoulder or a shoulder with an in particular finely stepped gradation, which is formed on the outer edge of the corresponding blade, said outer edge being arranged towards the head, wherein the oblique shoulder or the steps of the gradation is inclined with a slope with respect to a plane which has the axis of rotation of the core as a perpendicular, wherein the shoulders of the blades are arranged at different heights from one another along the axis of rotation of the core.

The object is achieved in a satisfactory way with the fastening device according to the invention.

The blades are elastic here in such a manner that an outer edge of the blade can bend upon mounting in the direction of the core. The shoulder of the blades is located in each case on the side of the blade which is arranged towards the head, i.e. on an upper side of the blade.

The described plane which has the axis of rotation of the core as a perpendicular is a horizontal plane which is also arranged, for example, parallel to the main direction of extent of the head.

The slope of the oblique shoulder with respect to the plane preferably has a value in a value range of between 10% and 200%, preferably between 20% and 150% and particularly preferably between 50% and 100%. For example, the slope of the oblique shoulder can be 100%, in which case a slope angle of 45° would be enclosed between the oblique shoulder and the plane.

When it is mentioned that the oblique shoulders of the blades are arranged at different heights from one another along the axis of rotation of the core, this means that they are arranged at positions which are at different distances from the head.

When a "high" element (for example a high shoulder) is referred to below, this means that the element is at a small distance from the head of the fastening device; whereas a "low" element is at a large distance from the head of the fastening device.

By the oblique shoulders of the blades being arranged at different heights from one another along the axis of rotation of the core, a pull effect can be achieved during the mounting, the pull effect pushing or pulling the fastening device or the head of the fastening device in the direction of the plate-like element. Therefore, only a small installation force is required for the fastening device according to the invention.

The at least one group of blades which are elastic at least in regions has at least two, preferably more than two, particularly preferably more than five blades. For example, the at least one group of blades which are elastic at least in regions can advantageously have six blades.

Plate-like elements are also understood as meaning elements which have merely an at least substantially plate-like region (to which the fastening device is fastened). Apart from said substantially plate-like region, the plate-like elements can accordingly also be designed in some other way.

According to an advantageous development of the invention, the blades of the at least one group of blades which are elastic at least in regions are arranged next to one another in a manner sorted according to the height of their oblique shoulders.

That is to say that, for example, as viewed from below in the clockwise direction around the circumference of the core of the fastening device, the oblique shoulders are arranged from high (in the vicinity of the head) to low (far away from the head).

According to an advantageous development of the invention, that point of the oblique shoulder of a blade which is furthest away from the head (i.e. the lowest point of the shoulder which is furthermore the furthermost outer point of the oblique shoulder) is further away from the head (i.e. lower) than the point (the highest point), which is arranged closest to the head, of the oblique shoulder of an adjacent blade, the shoulder of which is further away from the head (i.e. lower).

This therefore means that the oblique shoulders of adjacent blades merge into one another in such a manner that there is no gradation between the oblique surfaces, into which the plate-like element during the mounting could come to lie in such a manner that the pull effect of the fastening device is disturbed. Consequently, a uniform pull effect without "coming to a stop" can be achieved by the design according to the invention of the blades.

According to an advantageous development of the invention, three groups of blades which are elastic at least in regions are formed, said blades preferably being of identical design, wherein the blades are preferably arranged distributed uniformly along the circumference of the core.

It therefore follows that three blades at the same height or blades having oblique shoulders at the same height are always formed. The groups are arranged in this case following one another in the circumferential direction, and therefore the three blades with the oblique shoulders at the same height are in each case spaced apart from one another in the circumferential direction, wherein an angle of 120° is spanned between each blade. Accordingly, said blades are also arranged uniformly on the circumference.

If each group of blades in each case has six blades, in each case three blades would therefore be arranged level with the six different heights (of the oblique shoulders).

According to an advantageous development, each of the blades has a connecting region which connects the respective shoulder to the core.

According to an advantageous development of the invention, the corresponding connecting region of at least one of the blades, preferably of a plurality of the blades, particularly preferably of all of the blades adjacent to the corresponding shoulder, forms a stop region which is formed at least substantially orthogonally with respect to the plane with the axis of rotation of the core as a perpendicular. The stop region is therefore vertical or is a vertical plane. Alternatively thereto, however, it is also conceivable if the stop region is designed as a curved surface.

This means that the stop region is also formed orthogonally to the main direction of extent of the plate-like element and therefore parallel to the inner wall of the bore of the plate-like element to which the fastening device is fastened. The stop region can correspondingly form a stop for the plate-like element, and therefore the plate-like element is held securely.

According to an advantageous development of the invention, the connecting region on a side facing the head at least substantially does not have a slope with respect to the plane with the axis of rotation of the core as a perpendicular.

In other words, the surface of a side of the connecting region towards the head is a horizontal surface. The latter furthermore simultaneously runs parallel to the plane with the axis of rotation of the core as a perpendicular.

According to an advantageous development of the invention, the connecting region on a side facing the head has a slope or a slope profile with respect to the plane with the axis of rotation of the core as a perpendicular.

The upper side (facing the head) therefore does not form a horizontal surface, but rather has a curvature. In this embodiment, it is possible for the connecting region to merge into the shoulder.

Irrespective of how the side of the connecting region that faces the head is formed, the side of the connecting region that faces away from the head (i.e. the lower side) is preferably always curved, i.e. formed with a slope or a slope profile, in order to permit simple mounting of the fastening device.

According to an advantageous development of the invention, the connecting regions are formed at the same height along the axis of rotation of the core.

According to an advantageous development of the invention, the connecting regions are formed at different heights from one another along the axis of rotation of the core.

This means that the sides of the connecting regions of the blades that face the head can be at the same distance from the head or can be at different distances from one another from the head.

According to an advantageous development of the invention, the outer region of the oblique shoulder of at least one of the blades, preferably of a plurality of the blades, particularly preferably of all of the blades, does not have a slope with respect to the plane with the axis of rotation of the core as a perpendicular.

This means that the outer region of the oblique shoulder is correspondingly a horizontal surface. Consequently, said outer region (horizontal surface) is oriented perpendicularly to the inner wall of the bore in the plate-like element and can therefore exert a good fastening force.

According to an advantageous development of the invention, the head has a plate-like basic region and an annular region which encircles the latter and protrudes in the direction of the foot.

According to an advantageous development of the invention, the fastening device furthermore has sealing material which is arranged in an encircling manner on a surface of the head pointing in the direction of the foot (downwards).

According to an advantageous development of the invention, the annular region covers the sealing material laterally at least in regions, preferably completely.

The complete covering of the sealing material has the advantage that the latter, as it expands (for example under heat treatment or application of heat), can only expand in the direction of the plate-like element and inwards, and therefore a very good sealing effect is achieved.

In addition, the solution according to the invention consists in a method for producing a fastening device, which method has the following steps: injection moulding the head and the foot of the fastening device, wherein the annular region of the head points in a direction opposed to the foot; inserting the intermediate product consisting of the injection-moulded head and foot into a mould; closing the mould, wherein the annular region of the head is pressed downwards in the direction of the foot either during closing of the mould, or the annular region of the head is pressed downwards in the direction of the foot with the aid of a manipulator, in particular robot, specifically in each case in such a manner that, at least after the closing of the mould, the annular region protrudes from the plate-like basic region in the direction of the foot; and injecting the sealing material on a surface of the head that points in the direction of the foot.

This method in particular affords the advantage that the intermediate product consisting of the injection-moulded head and foot is injection moulded in such a manner that the annular region of the head does not point in the direction of the foot. If the annular region of the head were already to point at this juncture in the direction of the foot, the formation of the blades which are elastic at least in regions may be disturbed by the annular region.

A geometry in which the annular region of the head points in a direction opposed to the foot can therefore be produced better by means of injection moulding. By turning around the annular region during closing of the mould, the advantages of the annular region that exist in conjunction with the sealing material can simultaneously also be used.

BRIEF DESCRIPTION OF THE DRAWINGS

The invention will be explained in more detail below using the description of exemplary embodiments with reference to the attached drawings.

In the drawings.

DETAILED DESCRIPTION

Figure 1:
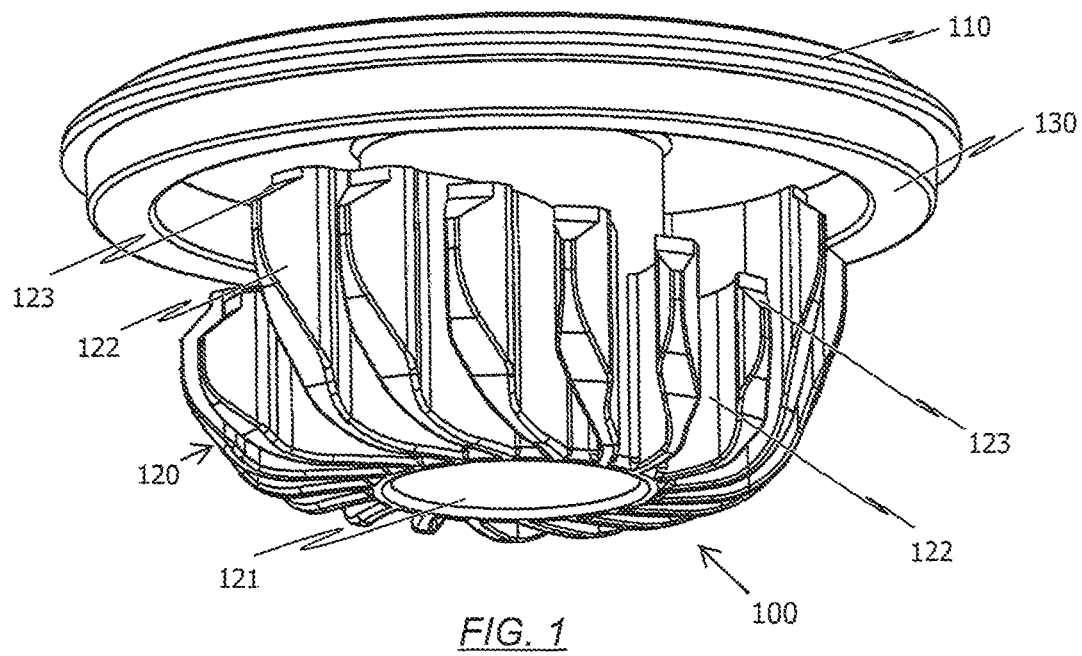
FIG. 1 shows a schematic top view of a fastening device according to the present invention from obliquely at the bottom.

Reference is first of all made below to FIG. 1 which shows a schematic top view of a fastening device 100 according to the present invention.

The fastening device 100 has a head 110 and a foot 120. Sealing material 130 is arranged in an encircling manner on the lower side of the head 110 (the side facing the foot 120).

The foot 120 extends downwards from the head 110 in FIG. 1 and has a core 121 and a multiplicity of blades 122.

The blades 122 extend outwards from the core 121. The blades 122 are arranged in groups, wherein a group of blades 122 in this embodiment of the fastening device 100 has six blades 122 at various heights.

Each blade 122 has an oblique shoulder 123, wherein the oblique shoulders 123 are formed on an outer edge of the corresponding blade 122.

The oblique shoulders 123 of the blades 122 of a group of blades 122 are arranged at different heights from one another. That is to say that the distances of the oblique shoulders 123 of the various blades 122 of a group of blades 122 from the head 110 vary or are different from one another.

The fastening device 100 in FIG. 1 has three groups of blades 122 each having six blades 122. Each group of blades 122 is constructed identically here, and therefore a total of six times three blades 122 having the oblique shoulder 123 at the same height are arranged on the core 121 of the foot 120.

The blades 122 in the respective group of blades 122 are sorted in height or height of their oblique shoulders 123.

In this embodiment, the oblique shoulders 123 of the blades 122 of a group are arranged descending in the clockwise direction, as viewed from below, that is to say that the oblique shoulders 123 of a group are arranged ever further away from the head 110 in the clockwise direction.

All in all, the blades 122 are arranged in a manner distributed uniformly around the circumference of the core 121. That is to say that a third of the circumference of the core 121 is assigned to each of the three groups. This also means that, when the groups of blades 122 are constructed identically, the blades 122 having oblique shoulders 123 are distributed uniformly at the same height (same distance from the head 110) on the circumference of the core 121. In particular, a circular segment having a centre point angle of 120° lies between said groups of blades.

If the fastening device 100 is inserted or mounted in a plate-like element or in a bore arranged therein, the following effect is produced:

When the blade 122 having the oblique shoulder 123 arranged lowest (furthest away from the head 110) is overcome, a pull effect arises which pulls the fastening device 100 or the head 110 of the fastening device 100 in the direction of the plate-like element. The reason is in particular that the blades 122 are of flexible design and push outwards in the plate-like element or the bore of the plate-like element and because of the oblique shoulders 123 of the blades 122 that pull the fastening device 100 in the direction of the plate-like element.

Figure 2A:
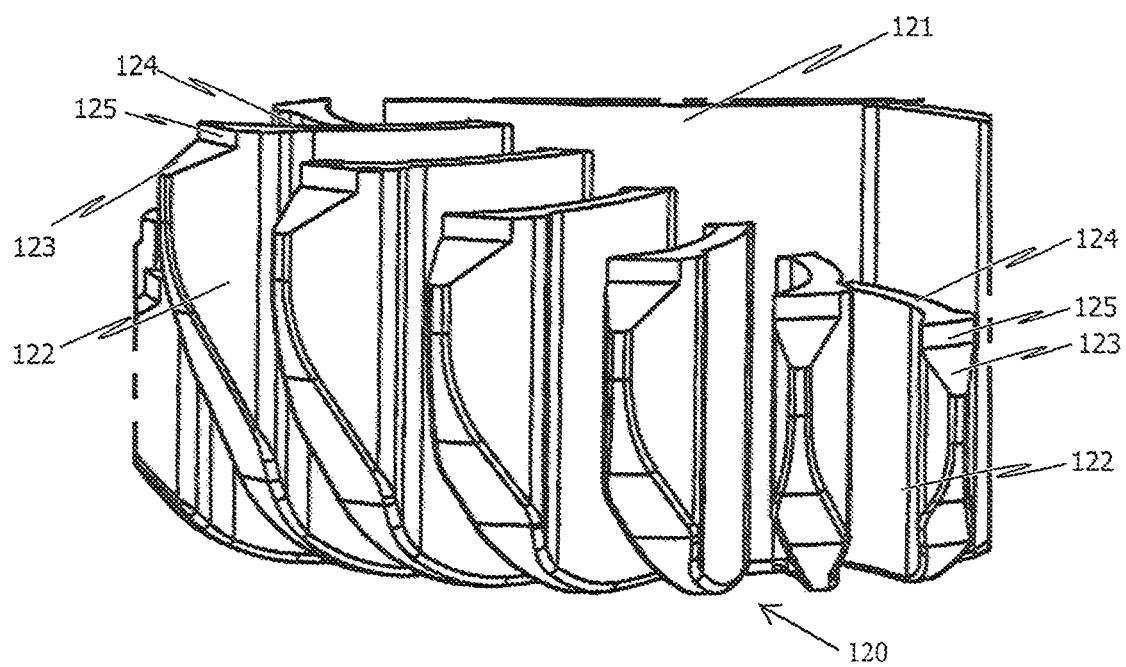
FIGS. 2A to 2C show schematic illustrations of the foot of the fastening device in different embodiments.
Figure 2B:
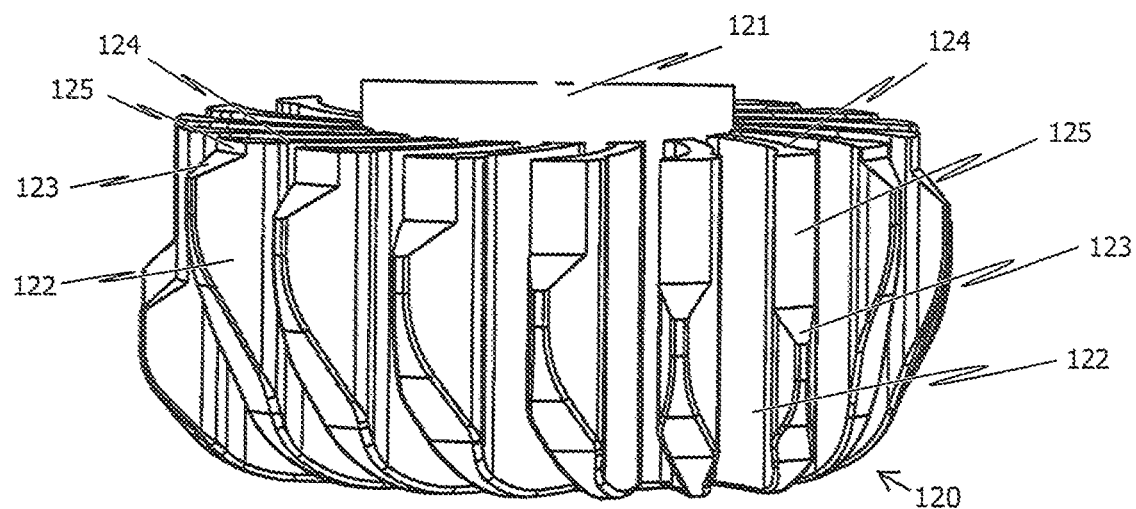
Figure 2C:
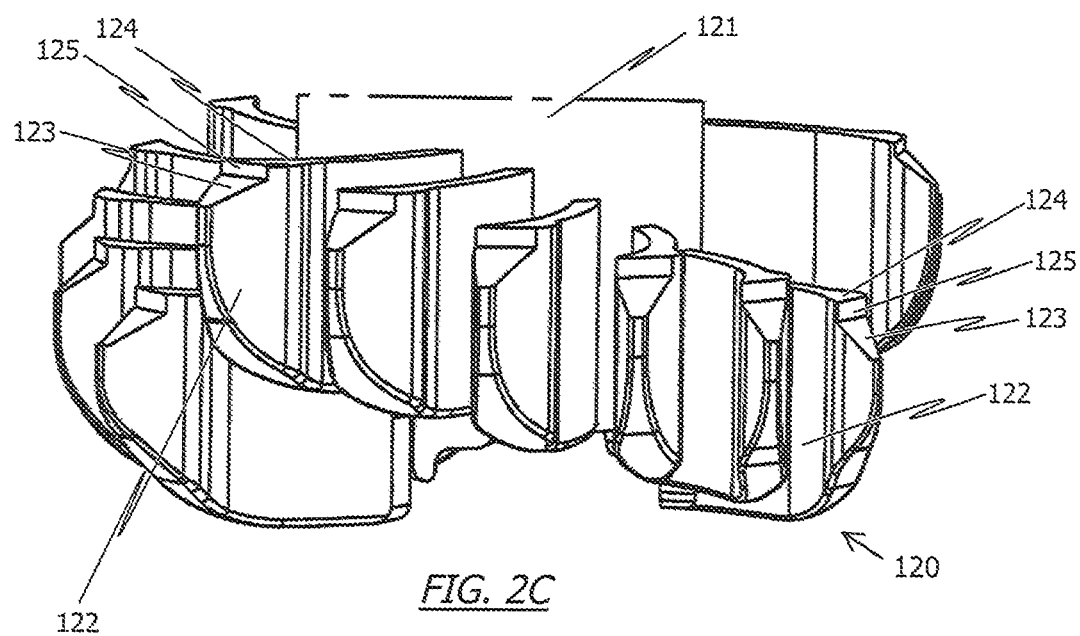

FIGS. 2A to 2C show schematic illustrations of feet 120 of the fastening device 100 according to the present invention in various embodiments.

As illustrated in FIG. 2A, the blades 122 have a connecting region 124 which connects the oblique shoulder 123 of the blades 122 to the core 121 of the foot 120.

A stop region 125 which substantially has a vertical surface is formed on a region of the connecting region 124 that is adjacent to the oblique shoulder 123. Said stop region 125 serves as a stop for the plate-like element or for the bore of the plate-like element.

As can be seen in FIGS. 2A to 2C, the stop regions 125 are arranged at different distances from the head 110. The fastening device 100 is therefore suitable for plate-like elements having different thicknesses or thickness tolerances.

In simplified terms, the inner side of the bore of a thick plate-like element lies against a blade 122 (or, in the case of three groups of blades 122, against three blades 122) which has a stop region 125 which is at a distance from the head 110. These are the blades 122 which are arranged on the right side in FIG. 2A.

If, by contrast, a thin plate-like element is present, the fastening device 100 assisted by the above-described pull effect is pushed or pulled into the bore of the plate-like element to an extent such that the inner wall of the bore of the plate-like element comes to stop against a stop region 125 of a blade 122, said stop region being arranged close to the head 110 of the fastening device 100. This applies to the left of the blades 122 shown in full in FIG. 2A.

The feet 120 illustrated in FIGS. 2A to 2C furthermore share the feature that their connecting regions 124 have a substantially horizontal surface on an upper side (side in the direction of the head 110). That is to say that said horizontal upper side of the connecting regions 124 is arranged orthogonally to the stop region 125 of the corresponding blade 122.

In other words, the upper side of the connecting region 124 is arranged parallel to the plane with the axis of rotation 121a of the core 121 as a perpendicular (upper side of connecting region 124 is parallel to a plane that is perpendicular to the axis of rotation 121a of the core). In a corresponding manner, the stop regions 125 of the blades 122 are arranged orthogonally with respect to said plane.

It is also apparent in FIGS. 2A to 2C that the region arranged highest (smallest distance from the head 110) of the oblique shoulder 123, i.e. the boundary region with respect to the stop region 125, of a first blade 122 is arranged higher (i.e. closer to the head 110) than the lowest region of the oblique shoulder 123, i.e. the outer region of the oblique shoulder 123, of a blade 122 which has an oblique shoulder 123 formed higher (lying closer to the head 110). This ensures that there is a step-free transition between adjacent oblique shoulders 123 and the pull effect is provided without any impairment.

The embodiments illustrated in FIGS. 2A to 2C differ in that the blades 122 differ in design. In FIG. 2A, the upper sides (side oriented in the direction of the head 110) of the connecting regions 124 are arranged at different distances from the head 110 corresponding to the oblique shoulders 123 and the stop regions 125 of the blades 122.

The lower sides of the blades 122 are formed substantially similarly and at the same height, and therefore the blades 122 become smaller from the blade placed closest to the head 110 to the blade 122 which is furthest away.

This embodiment has the advantage that only three stop regions 125 ever come into contact with the plate-like element, and therefore friction (braking force during the installation) occurs only in said stop regions.

In FIG. 2B, the connecting regions 124 are all arranged at the same height, i.e. all at the same distance from the head 110.

Since, however, the oblique shoulders 123 have to be arranged at different heights, i.e. at different distances from the head 110, the length of the stop region 125 is changed here. That is to say that the stop region 125 of a blade 122 arranged close to the head 110 is small and the stop region 125 of a blade 122 arranged at a distance from the head 110 is comparatively large.

This embodiment has the advantage that, when there are three groups of blades 122, the plate-like element can rest on more than only three stop regions 125 of the blades 122.

In FIG. 2C, all of the blades 122 are of substantially identical design, wherein the height offset between the oblique shoulders 123 (and the stop regions 125) takes place by the fact that all of the blades 122 are arranged at different heights along the axis of rotation of the core 121 or at different distances from the head 110.

Figure 3:
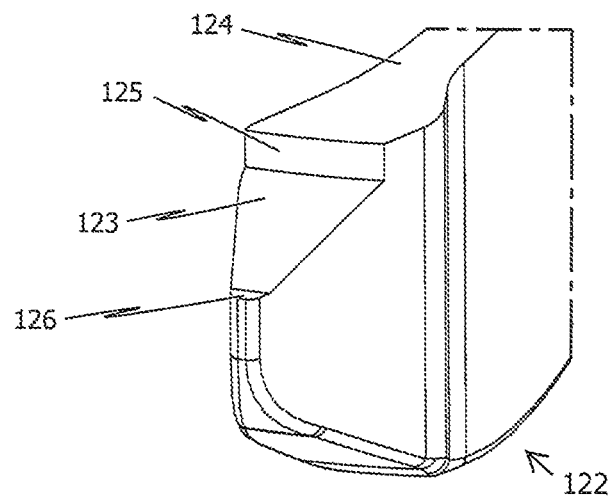
FIG. 3 shows a schematic illustration of a blade of a fastening device according to the present invention.

FIG. 3 shows a schematic illustration of a blade 122. The blade 122 has the oblique shoulder 123 already discussed and the connecting region 124. The blade 122 also has the (vertical) stop region 125.

In this embodiment, the blade 122 furthermore has an outer region 126 on the outside. Said outer region 126 has an upper side which is oriented substantially horizontally. That is to say that said upper side is oriented substantially in the direction of extent of the plate-like element. Said horizontal upper side or surface serves to improve the holding force of the fastening device 100.

Figure 4:
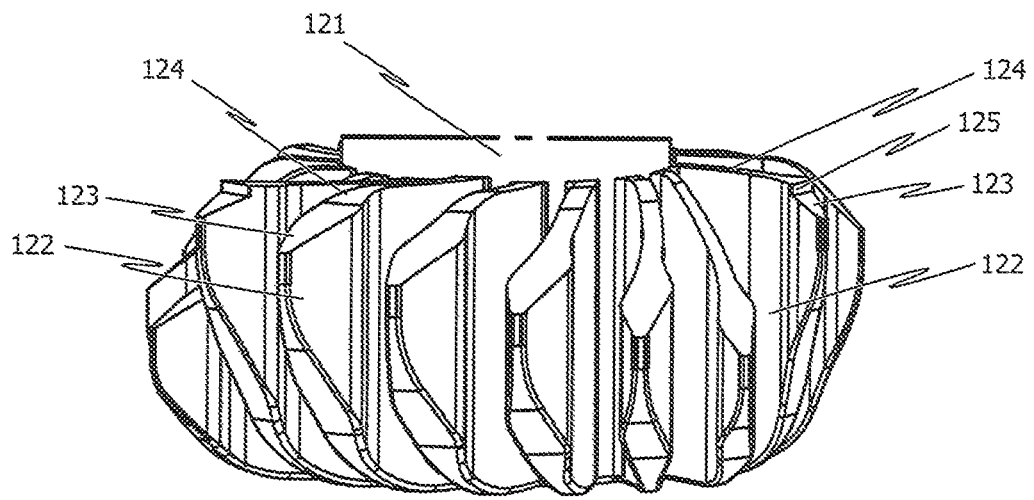
FIG. 4 shows a schematic illustration of a further foot of a fastening device according to the present invention.

FIG. 4 shows a further embodiment of a foot 120 of a fastening device 100 according to the present invention.

In this embodiment, a plurality of connecting regions 124 of the blades 122 are not oriented horizontally, but rather obliquely or in an arcuate manner. As shown, the connecting regions 124 emerge here without a step into the oblique shoulders 123 in such a manner that a stop region 125 is not produced.

In the embodiment illustrated in FIG. 4, only the blade 122 having the oblique shoulder 123 lying highest (closest to the head 110) has a stop region 125. Of course, it would naturally also be conceivable for the next blade or the next blades 122 to have a stop region 125.

In the case of the blade 122 which has a stop region 125, the connecting region 124 is preferably designed as a horizontal surface, that is to say that the upper side thereof (towards the head 110) has a substantially horizontal surface.

Figure 5A:
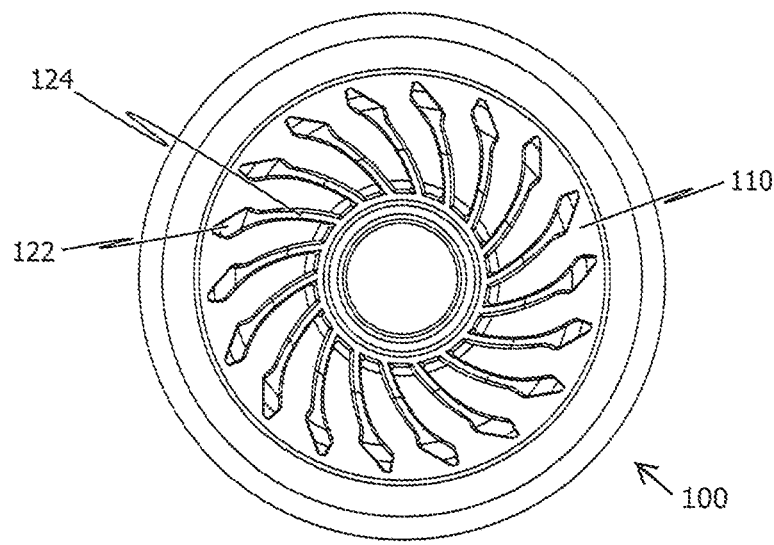
FIGS. 5A to 5C show top views from below of fastening devices with blades in various embodiments.
Figure 5B:
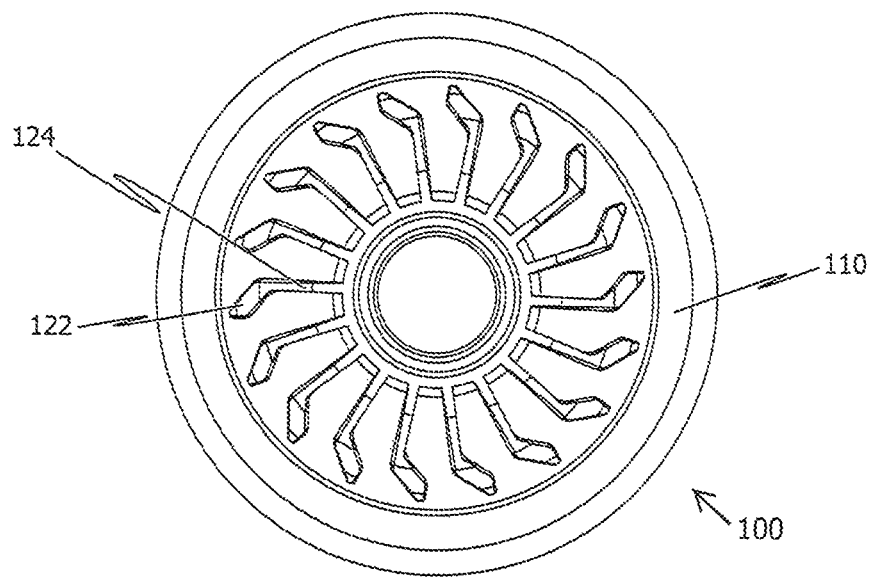
Figure 5C:
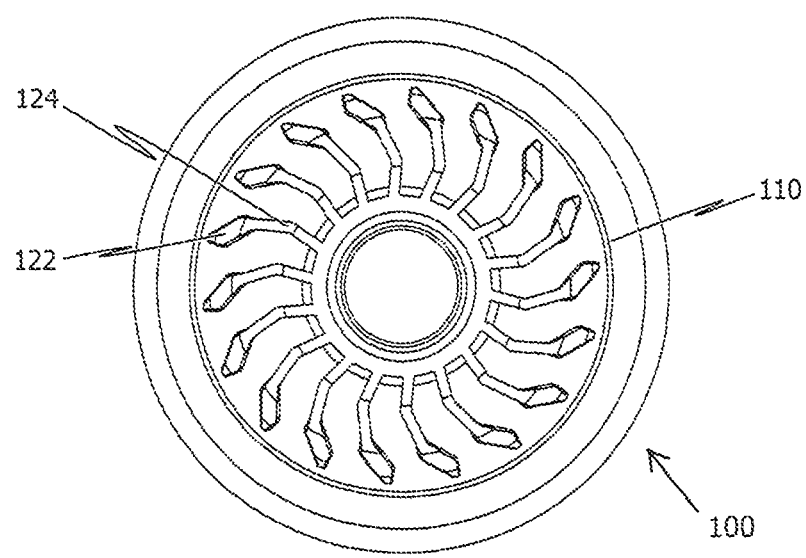

FIGS. 5A to 5C show top views of various fastening devices 100 according to the present invention, wherein said fastening devices differ in the precise design of the connecting region 124.

In FIG. 5A, the connecting regions 124 are of slightly arcuate design from below, i.e. as seen in the direction of the axis of rotation of the core 121.

In FIG. 5B, the connecting regions 124 of the blades 122 are of substantially rectilinear design, that is to say that an extension of same intersects in the axis of rotation of the core 121.

In FIG. 5C, the connecting regions 124 of the blades 122 have a kinked shape, wherein the kink is formed by a change in slope of the connecting region 124.

Such a variation in the connecting regions 124 makes it possible to influence the elasticity behaviour or the flexibility of the blades 122. Consequently, the blades 122 can be of more flexible and less flexible design by means of the shape of the connecting region 124.

Figure 6A:
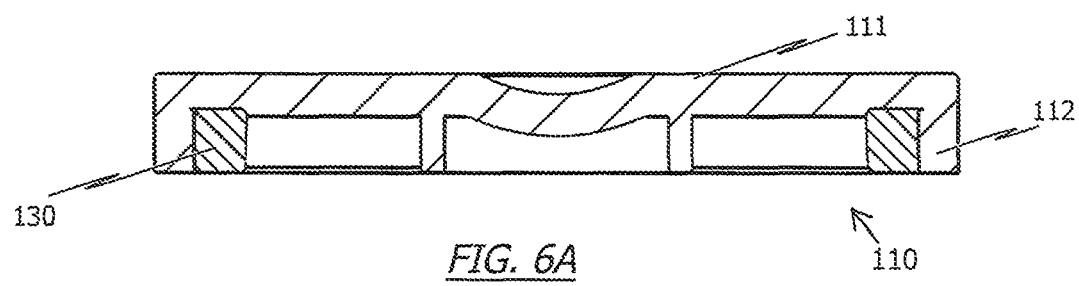
FIGS. 6A to 6C show schematic illustrations of heads of the fastening device according to the present invention in various embodiments.
Figure 6B:
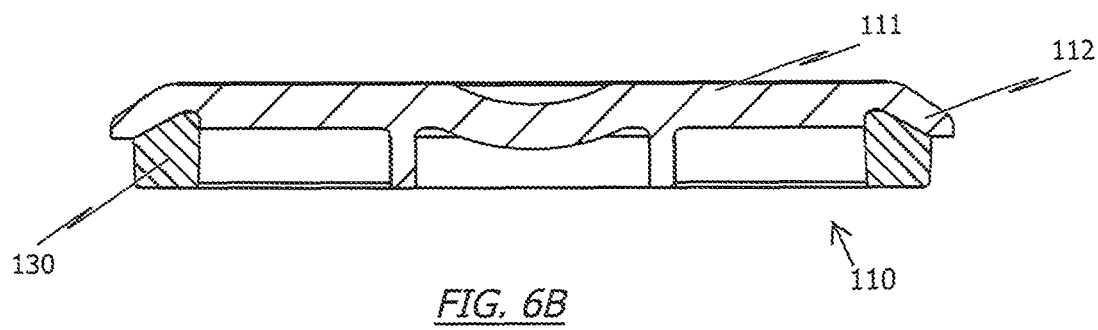
Figure 6C:
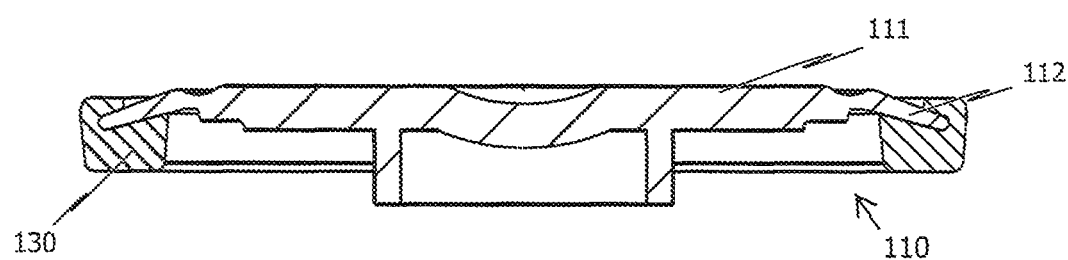

FIGS. 6A to 6C show various schematic illustrations of heads 110 of the fastening device 100.

As illustrated for example in FIG. 6A, the head 110 has a plate-like basic region 111 and an annular region 112. The annular region 112 is formed substantially on a circumference of the plate-like basic region and protrudes in the direction of the foot 120.

In addition, the plate-like basic region 111, as shown in FIG. 6A, can have a recess in which the sealing material 130 can be injected.

The head illustrated in FIG. 6A covers the sealing material 130 from above by means of the plate-like basic region 111 and completely from the side by means of the annular region 112. That is to say that the sealing material 130 is only exposed downwards and inwards and can expand.

This is relevant in particular whenever the fastening device 100 as it is being fastened to the plate-like element is subjected to an application of heat which causes the sealing material 130 to expand. If the head 110 surrounds the sealing material laterally and at the top, the latter as it expands can expand only inwards and towards the plate-like element, and therefore a good sealing effect of the sealing material 130 is produced.

In addition, the head 110 or the annular region 112 thereof can shield the sealing material 130 from external influences.

FIG. 6B shows an embodiment in which the annular region 112 is of flatter design and covers the sealing material 130 only in regions on the side, and therefore regions of the sealing material 130 are exposed towards the side.

FIG. 6C shows an embodiment in which the annular region 112 is of even flatter design, wherein the sealing material 130 surrounds the annular region in such a manner that it is exposed towards the side and upwards at least in regions.

Consequently, various embodiments of the head 110 and of the sealing material 130 are conceivable.

Figure 7A:
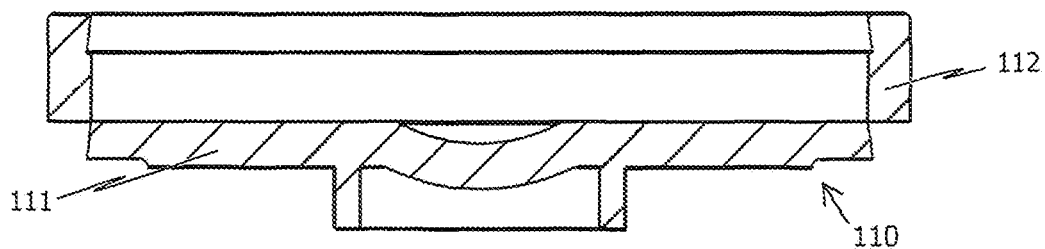
FIG. 7 shows illustrations for the method for producing a fastening device according to the present invention.

FIG. 7 serves for explaining the method of producing a fastening device according to the present invention. In particular, the method for producing a fastening device 100 with a head 110 according to FIG. 6A of the present invention is shown here.

In a first step, the head 110 and the foot 120 of the fastening device 100 are produced by means of injection moulding, wherein, as shown in the upper figure of the head 110 in FIG. 7, the annular region 112 does not point in the direction of the foot 120, but rather in the opposite direction.

This has the advantage that the blades 122 can be formed on the foot 120 without interference by the annular region 112.

Figure 7B:
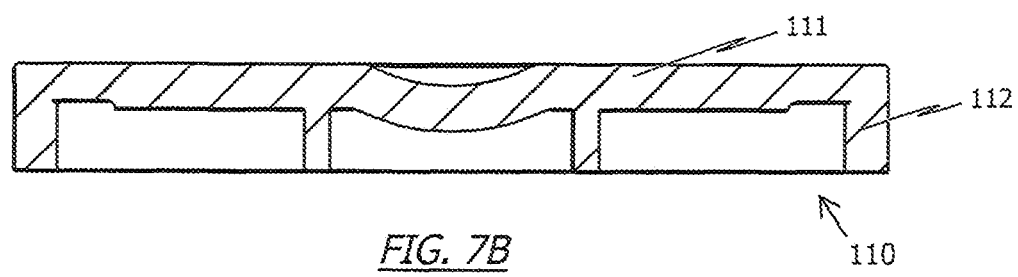

In a next step, the annular region 112 of the head 110 is folded over in such a manner that it now protrudes in the direction of the foot 120 (illustration in FIG. 7B). This takes place, for example, by insertion of the head 110 or of the fastening device 100 into a mould, wherein, when the mould is closed, the annular region 112 is pressed in the other direction.

Figure 7C:
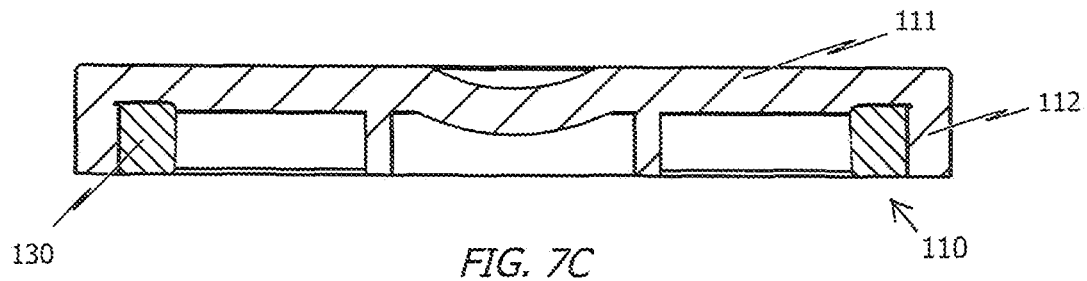

The annular region 112 is then in its end position and the sealing material 130 can be sprayed onto the head 110 (see illustration of the head in FIG. 7C).

The invention claimed is:

1. A fastening device for fastening to a plate-like element, wherein the fastening device has a head and a foot, wherein the foot has the following:
   a core which extends from the head along an axis of rotation; and
   at least a first group of blades which are elastic at least in regions and extend outwards from the core,
   wherein each of the blades of the first group has an oblique shoulder, which is formed on an outer edge of the corresponding blade, said outer edge being arranged towards the head,
   wherein, as to each blade of the first group, the oblique shoulder is inclined with a slope with respect to a plane which has the axis of rotation of the core as a perpendicular,
   wherein the oblique shoulder of each of at least a first blade and a second blade of the first group has a corresponding first point that is located closest to the head, and the oblique shoulders of the first and second blades are arranged at different heights from one another along the axis of rotation of the core such that a distance between the head and the first point of the first blade is different than a distance between the head and the first point of the second blade.

2. The fastening device according to claim 1,
   wherein the first and second blades are arranged next to one another or adjacent to one another in a manner sorted according to the height of their oblique shoulders.

3. The fastening device according to claim 1,
   wherein a second group of blades which are elastic at least in regions are formed, said blades of said second group being of identical or at least substantially identical design to the blades of the first group, and
   wherein the blades are arranged distributed uniformly along the circumference of the core.

4. The fastening device according to claim 1,
   wherein each blade of the first group has a connecting region which connects the respective oblique shoulder to the core.

5. The fastening device according to claim 4,
   wherein the corresponding connecting region of at least one of the blades of the first group, forms a stop region which is formed at least substantially orthogonally with respect to the plane.

6. The fastening device according to claim 4,
   wherein the connecting region on a side facing the head at least substantially does not have a slope with respect to the plane.

7. The fastening device according to claim 4,
   wherein the connecting region on a side facing the head has a slope or a slope profile with respect to the plane.

8. The fastening device according to claim 4,
   wherein the connecting regions are formed at the same height or at least substantially at the same height along the axis of rotation of the core.

9. The fastening device according to claim 4,
   wherein the connecting regions are formed at different heights from one another along the axis of rotation of the core.

10. The fastening device according to claim 1,
    wherein an outer region of the oblique shoulder of at least one of the blades, does not have a slope with respect to the plane.

11. The fastening device according to claim 1,
    wherein the head has a plate-like basic region and an annular region which encircles the plate-like basic region and protrudes in the direction of the foot.

12. The fastening device according to claim 1,
    wherein the fastening device furthermore has sealing material which is arranged in an encircling manner on a surface of the head pointing in the direction of the foot, wherein the sealing material has a hot-melt adhesive.

13. The fastening device according to claim 12,
    wherein the annular region covers the sealing material laterally at least in regions.

14. A method for producing a fastening device according to claim 12, wherein the method has the following steps:
    injection moulding the head and the foot of the fastening device, wherein the annular region of the head points in a direction opposed to the foot;
    inserting the intermediate product consisting of the injection-moulded head and foot into a mould;
    closing the mould, wherein the annular region of the head is pressed downwards in the direction of the foot either during closing of the mould, or the annular region of the head is pressed downwards in the direction of the foot with the aid of a manipulator, specifically in each case in such a manner that, at least after the closing of the mould, the annular region protrudes from the plate-like basic region in the direction of the foot; and
    injecting the sealing material on a surface of the head that points in the direction of the foot.

15. A fastening device for fastening to a plate-like element, wherein the fastening device has a head and a foot, wherein the foot has the following:
    a core which extends from the head along an axis of rotation; and
    at least a first group of blades which are elastic at least in regions and extend outwards from the core,
    wherein each of the blades of the first group has an oblique shoulder, which is formed on an outer edge of the corresponding blade, said outer edge being arranged towards the head,
    wherein, as to each blade of the first group, the oblique shoulder is inclined with a slope with respect to a plane which has the axis of rotation of the core as a perpendicular,
    wherein the oblique shoulders of each of at least a first blade and a second blade of the first group are arranged at different heights from one another along the axis of rotation of the core;
    wherein an entirety of each oblique shoulder of the first group is spaced radially away from an outer surface of the core;
    wherein, for each oblique shoulder of the first group, the oblique shoulder is connected to the core by a connecting region that with an upper side facing the head, the upper side being closer to the head than the oblique shoulder.

* * * * *